United States Patent Office

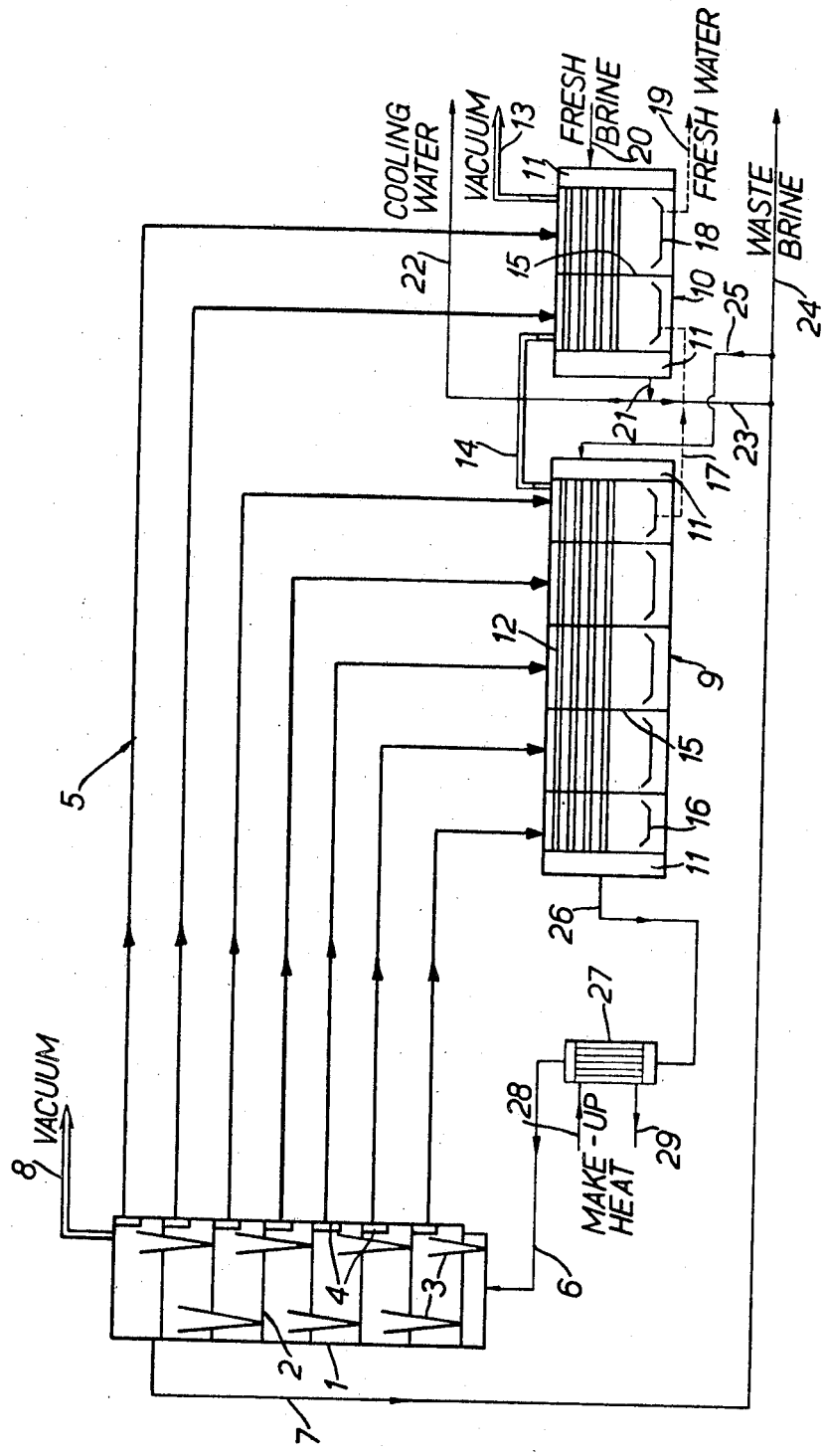

3,515,646
Patented June 2, 1970

3,515,646
VERTICAL MULTI-STAGE FLASH EVAPORATOR WITH SEPARATE HORIZONTAL CONDENSING CHAMBER
Peter Thomas Walker, Reading, and Ivan Henry Newson, Chilton, England, assignors to Weir Westgarth Limited, Glasgow, Scotland, a British company
Filed Apr. 20, 1967, Ser. No. 632,354
Int. Cl. B01d 3/02
U.S. Cl. 202—173         3 Claims

ABSTRACT OF THE DISCLOSURE

A brine desalination system is provided in which the heated brine is delivered to the bottom of a sectionalized tower in which it foams so that a mixture of steam and brine is formed as the brine flows up the tower from section to section to be withdrawn at the top. A steam withdrawal connection is provided for each tower section, from which the steam at a plurality of pressures is led away by separate lines to be condensed in different sections of a sectionalized condenser operating at different degrees of vacuum.

DESCRIPTION OF INVENTION

The present invention relates to desalination processes and apparatus.

It will be known that flash distillation is one practical method of effecting desalination of sea water or other saline or brackish water in order, for example, to provide fresh water of drinking quality or suitable for agricultural or individual use. In a conventional flash distillation plant the heated brine is caused to flow through a series of separate flashing chambers in each one of which a proportion of the brine is converted to steam and this steam is condensed on a water-cooled condensing surface to provide the fresh water. In such a conventional plant, each chamber is designed as a separate unit but the requirements for flashing and condensation of the flashed steam are frequently in conflict so that there is an over-design in the plant as a whole which leads to increased cost, and consequently a loss of efficiency.

It will be apparent that the cost of fresh water produced in a desalination plant depends upon the initial capital cost of the plant and the efficiency with which it is operated. Clearly, therefore, in order to reduce the cost of the fresh water it is desirable to reduce the capital cost and increase efficiency.

It is an object of the present invention to provide an improved desalination process and apparatus.

According to the present invention, there is provided a desalination process which comprises heating brine, passing the heated brine into the lower portion of a tower maintained at such a pressure that a mixture of steam and brine is formed in the tower, withdrawing brine from the upper part of such tower, withdrawing steam at a plurality of stages from within the tower and passing such withdrawn steam to a plurality of condensation stages operating at different pressures.

Thus it will be seen that the present invention differs from the conventional arrangement above described in that the steam is generated in a vertical flashing tower which may be designed to produce the steam in the most efficient manner possible and this steam is withdrawn and passed to a plurality of stages of a condenser which may be designed for most efficient condensing. It should be emphasized that the various stages of the condenser do not need to be separate devices but are preferably sections within a single condenser, condensate from one such section passing to the next section operating at a lower pressure. The condenser may be a brine-cooled surface or tube condenser.

According to a further aspect of the invention, there is provided desalination apparatus comprising a flashing tower including a plurality of plates and risers, whereby steam is generated in such tower at a plurality of pressures, in combination with a condenser having a number of separate stages and means supplying the steam from a number of different points up the tower to respective stages of the condenser.

In order that the present invention may more readily be understood one embodiment will now be described by way of example and with reference to the accompanying drawing which is a diagrammatic flow sheet of a desalination plant.

Referring now to the drawing, the apparatus shown comprises a vertical flashing tower 1 which has a plurality of horizontal plates 2 through each of which a riser pipe 3 passes. Each stage of the tower 1 is provided with steam outlet means 4 and the various steam outlet means are each connected to one of a plurality of steam conduits 5. Heated brine is supplied to the base of the tower 1 by a conduit 6 and the brine leaves the top of the tower through a conduit 7, vacuum being applied to the tower at its top by a vacuum line 8 so that the pressure at the top of the tower is of the order of 1 p.s.i.a. whilst the pressure at the bottom of the tower will depend upon the temperature of the brine in the conduit 6.

In the embodiment shown, two condensers are illustrated, namely a main condenser 9 and a reject heat condenser 10, each of these condensers being provided with conventional headers 11 and condenser tubes 12. A vacuum is applied to the condenser 10 by means of a vacuum line 13 and this vacuum is also applied to the condenser 9 by means of a vacuum line 14 which connects the two condensers. Each condenser is divided into a plurality of sections by means of separator plates 15 which do not make a completely steam-proof seal with the walls of the condenser or the tubes 12 so that the degree of vacuum provided by the vacuum line 13 decreases from the right-hand or cool end of the condenser 10 to the left-hand or hot end of the condenser 9. The total number of condenser sections is equal to the number of stages up the tower.

Each of the stages defined by the plates 15 is supplied with steam from the appropriate stage of the tower 1 by means of a steam conduit 5. That is to say, the bottom stage of the tower 1 has a steam line connection to the left-hand end section at the hot end of the condenser 9, and so on up the tower, the top stage being connected to the section at the cold end of the condenser 10.

The steam condensed in the condenser 9 is collected in troughs 16 and conveyed by a conduit 17 to troughs 18 in the condenser 10 from which it is withdrawn by a fresh water product conduit 19.

The inlet header at the cold end of the condenser 10 is supplied with raw sea water through a conduit 20 and the slightly warmed brine leaves the outlet header at the left-hand end of the condenser 10 through a conduit 21 and is divided into two parts, one of which flows to waste through a conduit 22 whilst the other is passed by a conduit 23 to the conduit 7 from the top of the tower. The brine flowing in this conduit 7 is then itself divided into two parts one of which is passed to waste through a conduit 24 whilst the remainder is passed by a conduit 25 to the inlet header 11 at the right-hand end of the condenser 9. The brine withdrawn from the outlet header at the hot end of the condenser 9 is passed by a conduit 26 to a tube-and-shell heat exchanger 27 where it is heated by steam entering and leaving through conduits 28 and 29. The heated brine leaves the heat exchanger 27 through the conduit 6 and is passed to the tower 1.

It should be mentioned that the construction above described permits a saving in pumping work as it is not necessary to pressurise the entire flow of brine and furthermore energy recovery is possible from the brine leaving the tower 1 by the conduit 7. These savings are additional to those inherent in the separation of the steam generation from the steam condensing parts of the apparatus as above described.

It will be apparent that additional efficiencies may be effected, in a conventional manner, over the diagrammatic arrangement shown in the flow sheet.

What we claim is:

1. Desalination apparatus comprising a vertical flashing tower divided by internal horizontal plates into a plurality of stages disposed one above another with associated brine risers leading brine flow up the tower from stage to stage and a separate individual steam outlet for each stage, an inlet for hot brine to the bottom stage of the tower, a first conduit means communicating with a source of vacuum and connected to the top stage of the tower, each succeeding stage up the tower operating at a lower pressure than the preceding stage below it, a plurality of condenser chambers equal in number to the number of tower stages and disposed in a horizontal row, with condenser tubes leading brine feed from a brine feed supply through the condenser chambers in series from the first to the last, a final brine feed line connected to the downstream ends of said condenser tubes to deliver brine feed leaving said last condenser chamber to said tower inlet for hot brine, a second conduit means communicating with a source of vacuum and connected to said first condenser chamber, each succeeding condenser chamber having limited communication with the condenser chamber preceding it so that said chambers operate at successively higher pressure, a separate individual steam line connecting each of said tower steam outlets to a respective condenser chamber, the top stage steam outlet being connected to the first condenser chamber, the tower stage steam outlet next down from the top being connected to the second condenser chamber in the series, and so on in order to the bottom of the tower, and means collecting condensate from each condenser chamber.

2. Apparatus according to claim 1, wherein a heat exchanger is provided in said final brine feed line to add make-up heat.

3. Apparatus according to claim 1, wherein said successive condenser chambers comprise first and second multi-chamber condensers connected in series, at least a portion of the brine feed leaving the first multi-chamber condenser is mixed into a return brine feed line that returns brine overflow from the top stage of the tower, and the feed brine for the second multi-chamber condenser is withdrawn from the mixed return brine.

References Cited
UNITED STATES PATENTS

| | | | |
|---|---|---|---|
| 1,524,184 | 1/1925 | Lawrence | 159—18 |
| 2,750,999 | 6/1956 | De Vries | 159—18 |
| 2,759,882 | 8/1956 | Worthen et al. | 203—11 |
| 3,249,517 | 5/1966 | Lockman | 202—173 |
| 3,257,290 | 6/1966 | Starmer | 203—11 |
| 3,303,106 | 2/1967 | Standiford | 159—18 |
| 3,356,592 | 12/1967 | Eubank et al. | 203—11 |
| 3,360,442 | 12/1967 | Starmer | 202—173 |

WILBUR L. BASCOMB, JR., Primary Examiner

U.S. Cl. X.R.

202—186; 203—11, 73, 88